(12) United States Patent
Frielinghaus

(10) Patent No.: US 11,109,713 B2
(45) Date of Patent: Sep. 7, 2021

(54) FOOD PREPARATION APPLIANCE WITH TOOL FOR CHOPPING

(71) Applicant: Vorwerk & Co. Interholding GmbH, Wuppertal (DE)

(72) Inventor: Robert Frielinghaus, Bochum (DE)

(73) Assignee: Vorwerk & Co. Interholding GmbH

( * ) Notice: Subject to any disclaimer, the term of this patent is extended or adjusted under 35 U.S.C. 154(b) by 94 days.

(21) Appl. No.: 16/279,484

(22) Filed: Feb. 19, 2019

(65) Prior Publication Data

US 2019/0254481 A1    Aug. 22, 2019

(30) Foreign Application Priority Data

Feb. 21, 2018    (EP) .................................... 18157755

(51) Int. Cl.
| | |
|---|---|
| *A47J 43/07* | (2006.01) |
| *A47J 43/046* | (2006.01) |
| *B01F 13/10* | (2006.01) |
| *B01F 15/00* | (2006.01) |
| *B02C 25/00* | (2006.01) |

(52) U.S. Cl.
CPC ............. *A47J 43/07* (2013.01); *A47J 43/046* (2013.01); *A47J 43/0716* (2013.01); *B01F 13/1041* (2013.01); *B01F 15/00194* (2013.01); *B01F 15/00409* (2013.01); *B02C 25/00* (2013.01); *A47J 2043/0733* (2013.01); *B01F 2013/108* (2013.01); *B01F 2215/0026* (2013.01)

(58) Field of Classification Search
CPC ....... B02C 25/00; A47J 43/07; A47J 43/0716; A47J 43/046; A47J 43/0727; A47J 43/08; B01F 13/1041; B01F 2013/108; B01F 15/00123; B01F 15/00194; B01F 15/00409
See application file for complete search history.

(56) References Cited

U.S. PATENT DOCUMENTS

| | | | |
|---|---|---|---|
| 2003/0025012 A1* | 2/2003 | Lassota .................. G01G 13/02 241/34 |
| 2018/0255975 A1* | 9/2018 | Kolar .................... B02C 18/083 |
| 2018/0272300 A1* | 9/2018 | Wallace ............ B01F 15/00305 |

FOREIGN PATENT DOCUMENTS

| | | |
|---|---|---|
| DE | 102013106691 A1 | 1/2014 |
| DE | 102016110710 A1 | 12/2017 |

\* cited by examiner

*Primary Examiner* — Faye Francis
(74) *Attorney, Agent, or Firm* — Barnes & Thornburg LLP

(57) ABSTRACT

A food preparation appliance includes a food preparation pot, a rotatable tool for chopping food in the food preparation pot and a sensor, in particular for weight determination of a food in the food preparation pot. A control unit is provided and configured such that, when a food is comminuted by the tool, the control unit is able to determine, based on a sensor signal from the sensor, whether a predetermined chopping state of the food has been reached.

12 Claims, 3 Drawing Sheets

FOOD PREPARATION APPLIANCE WITH TOOL FOR CHOPPING

PRIORITY CLAIM

Figure 1:
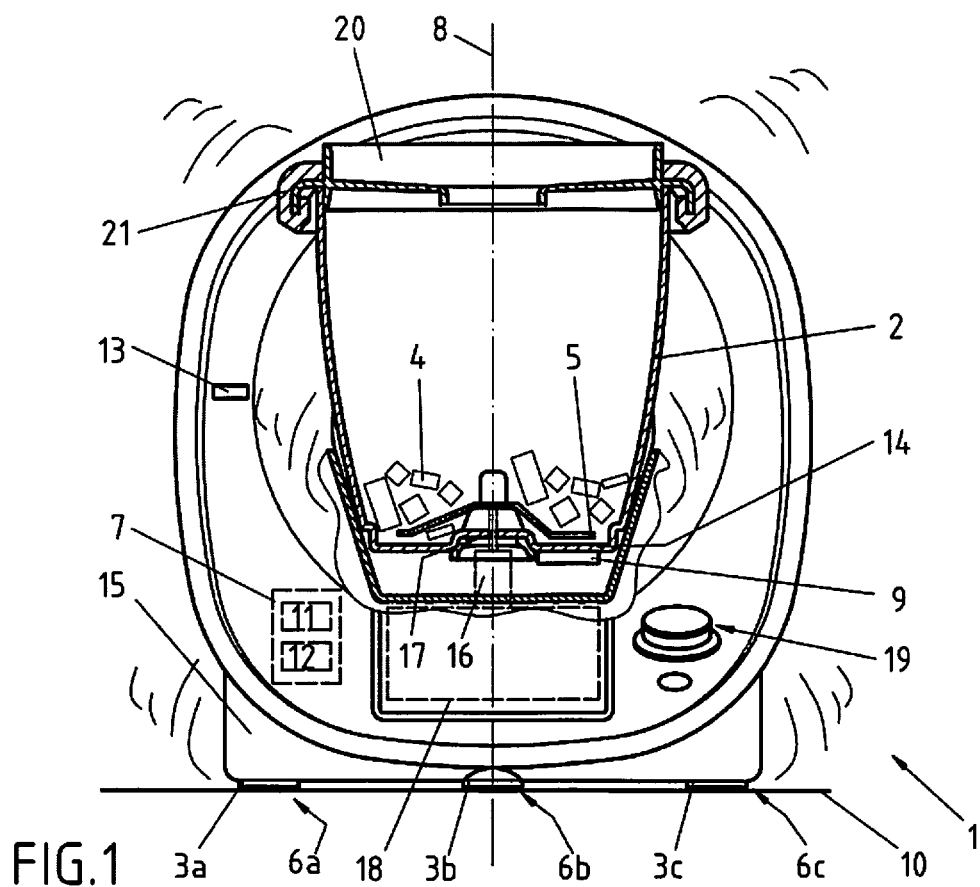

This application claims priority to European Application No. 18157755.2, filed Feb. 21, 2018, which application is hereby incorporated in its entirety herein.

FIELD OF THE DISCLOSURE

The present disclosure relates to a food preparation appliance comprising a food preparation pot, a rotatable tool for chopping food in the food preparation pot and a sensor, in particular for the weight determination of a food in the food preparation pot.

BACKGROUND

When chopping food with hard ingredients, such as ice, chocolate or Parmesan cheese, in a food processor or mixer, the determination of the required chopping time for obtaining a desired chopping state is usually based on experience. The predetermined time for chopping is frequently specified in recipes, such as in a recipe for preparing chocolate candies or for crushing ice. If the amount or properties of the food ingredients to be comminuted, such as the hardness or size distribution, are varied, an excessive or inadequate chopping may occur, compared with the desired chopping state. A chopping time fixed in the above-described manner usually cannot accommodate such variations and influences. Furthermore, an unnecessarily long chopping time results in unnecessarily prolonged noise disturbance.

Document EP2330955A1 discloses a food processor in which an imbalance in the operation of a stirring unit is detected by three weight sensors.

SUMMARY

The object of the present disclosure is to provide a food preparation appliance that has been developed further.

A food preparation appliance according to the main claim and a method and a computer program product according to the independent claim serve for achieving the object. Advantageous embodiments are apparent from the dependent claims.

A food preparation appliance, which comprises a food preparation pot, a preferably rotatable tool for chopping or comminuting food in the food preparation pot and a sensor, serves for achieving the object. Preferably, the sensor is provided for acquiring a measuring quantity during the chopping of food by the tool. In particular, the sensor is provided for determining the weight of food in the food preparation pot. A control unit is provided and configured such that, during the chopping of a food by the tool, the control unit is able to determine, based on a sensor signal from the sensor, whether a predetermined chopping state of the food has been reached. "During the chopping of a food" means during a chopping process of the food by means of the tool.

It is thus possible to obtain a particularly reproducible result in food preparation even in the case of relatively hard food constituents or ingredients. Moreover, a further automation is made possible for the preparation of food with the food preparation appliance. For example, the actual state and the actual quantity of the food constituents or ingredients to be comminuted can thus be taken into account by an automatic adjustment of the process parameters. Furthermore, the noise disturbance and energy consumption due to unnecessarily prolonged chopping can be reduced particularly reliably.

If the sensor is a sensor for weight determination, also referred to as a weight sensor, the sensor signal of an existing, in particular integrated, weight sensor of the food preparation appliance, which is usually employed for weighing the food in the food preparation pot, may additionally be used for determining that the predetermined chopping state has been reached. In principle, the usual weight determination also takes place on the basis of the sensor signal from the sensor for weight determination, which correlates with the weight to be determined, particularly in the state at rest of the food preparation appliance.

In particular, a measuring quantity is a physical property. Preferably, abrupt jumping movements and/or vibrational movements stemming from motion impulses by the collisions of the tool with hard food ingredients, which normally result in cracking acoustic sounds and noise emissions, may be reflected in the measuring quantity. As a matter of principle, such abrupt motion impulses are not produced during the chopping of a soft or already sufficiently comminuted food.

In one configuration, the measuring quantity is acoustic sound, the sound pressure level or the volume, which may be expressed, for example, in decibels (dB). In that case, the measuring quantity may be acquired by means of a microphone. An acoustic emission, which may have a high volume, is generated by the tool impacting hard food ingredients. The chopping sounds lessen when all large pieces of hard food ingredients within the reach of the tool have been processed or comminuted. In one configuration, the measuring quantity is the motor current. In that case, the measuring quantity may be acquired by a motor ammeter or provided by a motor control unit. The motor current with which the electric motor for driving the tool is supplied is dependent on the load on the electric motor. The load on the motor is increased by the tool impacting hard food ingredients and decreased as the degree of chopping rises. In one configuration, the measuring quantity is an acceleration. In that case, the measuring quantity may be acquired by means of an acceleration sensor or weight sensor. When the tool impacts a hard food ingredient, a partial rebound of the tool and/or an upward or downward deflection of the tool may occur. Thus, motion impulses are produced which may result in abrupt changes in acceleration. These motion impulses may be transmitted onto the entire food preparation appliance, for example via the rotary bearing of the tool, so that abrupt jumping and/or vibrational movements relative to the ground may occur. In one configuration, the sensor is an acoustic sensor, a microphone or a sound pick-up. In particular in this configuration, the sensor is preferably attached directly to the food preparation pot or the housing of the food preparation appliance. In one configuration, the sensor is a motor ammeter. In one configuration, the sensor is an acceleration sensor. The sensor is preferably attached directly to the tool, the food preparation pot or the housing of the food preparation appliance.

In one embodiment, the control unit is configured such that an indication is outputted to the user when the control unit has determined, based on the sensor signal, that a predetermined chopping state of the food has been reached. It is thus made possible for the user to decide for himself whether he terminates the chopping process as proposed, or whether he deviates from the proposal, e.g. for individually adapting the recipe, and comminutes for a longer period of time for a higher degree of chopping. In particular, the indication indicates that the tool may be stopped. Preferably, the indication is visually outputted via a display, and/or acoustically via a loudspeaker.

In one embodiment, the control unit is configured such that a process parameter for food preparation is automatically adjusted when the control unit has determined, based on the sensor signal, that a predetermined chopping state of the food has been reached. It is thus possible to obtain a particularly high degree of automation and reproducible cooking result. In particular, a process parameter for food preparation is a rotation setting of the tool, the rotary speed of the tool, the activation or deactivation of the tool, the remaining chopping time, a cooking temperature and/or a cooking time. The rotary setting may be adjusted within a stepped pattern, such as 1 to 10, for example. A particular set rotary speed is predefined for the tool for each rotary setting. A desired degree of chopping may approximately correlate with the rotary setting, i.e., the higher the rotary setting, the higher the desired degree of chopping. The rotary setting may generally be set by the user and/or the control unit. The deactivation of the tool results in the tool stopping. A remaining chopping time may be provided as a safety buffer, so that all pieces are comminuted with a particularly high degree of certainty. Preferably, no remaining chopping time is provided in the present case. In order to control the cooking temperature, a thermoelectric element is preferably provided for heating food in the food preparation pot. Thus, the cooking temperature may be increased, or the cooking time extended, for example, in the case of a low degree of chopping.

In one embodiment, the control unit is configured such that the tool is automatically stopped when the control unit has determined, based on the sensor signal, that a predetermined chopping state of the food has been reached. Unnecessary energy consumption and unnecessary noise disruption may be avoided in this manner. Generally, stopping the tool means that the tool is no longer driven for rotating, so that frictional resistances slow down the tool and lead to a stop. Automatic stopping of the tool can be implemented particularly easily by the control unit deactivating the tool of the drive unit for the tool or setting a rotary speed of zero as the nominal rotary speed for the drive unit.

In one embodiment, the predetermined chopping state is defined by a monitoring threshold. It is thus possible for the control unit to determine particularly easily, control-wise, whether a predetermined chopping state of the food has been reached. A monitoring threshold is a preferably digital value stored in the control unit. This value may be used in an algorithm, for instance, or the value is used within the context of the determination process.

In one embodiment, the control unit is configured such that the monitoring threshold is predetermined depending on a selected recipe, in particular by the control unit or by the user. A particularly precise determination of whether a desired chopping state has been reached is thus achieved. In particular, the control unit may access a selected recipe for this purpose, or the user may set the monitoring threshold in accordance with the recipe. Since the ingredients in a recipe are known, the monitoring threshold can be set particularly precisely by taking into account general characteristics in the signal curve during the chopping of a certain ingredient or food. A particularly precise termination of the chopping process can thus be achieved, i.e. in this case in a timely manner exactly when the food is comminuted just sufficiently, i.e. when the degree of chopping is as desired. In one configuration, the control unit uses a measuring quantity for setting or adjusting the monitoring threshold, preferably continuously during the chopping process. A particularly precise mode of operation is thus made possible.

In one embodiment, the control unit is configured such that, during the chopping of food by the tool, the control unit determines, based on a monitoring value, whether a predetermined chopping state of the food has been reached. A particularly precise determination of whether a desired chopping state has been reached is thus achieved. A monitoring value is a preferably digital value that can be processed by the control unit. The monitoring value may be used in an algorithm, for instance, or the monitoring value is used within the context of the determination process. In particular, the monitoring value may be compared with the monitoring threshold in a preferably continuous manner, in order to obtain a monitoring result with respect to the predetermined chopping state of the food in the food preparation pot.

In one embodiment, the sensor signal is the monitoring value. Thus, the effort for signal pre-processing may be saved. In that case, the sensor signal, which is, in particular, analog, is then used as the monitoring value. Monitoring of the monitoring value may take place in an analog manner, in particular taking into account the monitoring threshold.

In one embodiment, the control unit is configured such that the control unit calculates the monitoring value based on the sensor signal of only a single sensor. Monitoring that has a particularly simple structure and is easy control can be realized in this manner. In particular, only a single weight sensor, only a single acoustic sensor or only a single acceleration sensor suffice for reliably determining whether a predetermined chopping state of the food has been reached. Alternatively or additionally, the control unit is configured such that the control unit calculates the monitoring value based on the sensor signals of several sensors. For example, a total weight of a food or of the food preparation pot with or without the food contained therein can be determined by means of several weight sensors, and this total weight can be used as the monitoring value. Alternatively or additionally, the monitoring value may be a calculated quantity determined by a calculating algorithm that determines the monitoring value based on the sensor signal from a weight sensor and another sensor, e.g. an acoustic sensor. By including different sensors for different measuring quantities, a particularly reliable and precise determination of the chopping state of the food in the food preparation pot can be achieved.

In one embodiment, the monitoring value is a measure of dispersion, in particular a moving measure of dispersion. A particularly reliable and precise determination of the chopping state of the food in the food preparation pot can be achieved in this manner. A measure of dispersion is a measure for the dispersion range of a variable quantity. The variable quantity may be the sensor signal from only a single sensor. The variable quantity may be calculated from the sensor signals of several constructionally identical and/or different sensors. The variable quantity may be the result of signal filtering and/or signal pre-processing. The technical term "moving", also referred to as "running", means taking the mean over a predetermined and/or constant number of values of the variable quantity that are provided in a certain order in a series within a window. The window may be defined by the maximum number of values or by a timespan. For example, the window includes a maximum of 15 sensor signals successively transmitted by a sensor. In operation, the window is shifted in an overlapping manner, that is, when a new value in the order is the last to be added, a first value according to the order is deleted from the window that is being considered. A smoothing over time of the measure of dispersion can be made possible by providing a moving monitoring value.

In one configuration, the monitoring value is a deviation of the variable quantity from an, in particular moving, mean of the variable quantity. Alternatively or additionally, a model-based algorithm is used for calculating the monitoring value. In one configuration, the monitoring value corresponds to the variance. Generally, variance is symbolized by "Var" and corresponds to $\sigma^2$, i.e. the standard deviation sigma squared. Preferably, the monitoring value is the moving variance, also referred to as running variance, which is the result of squaring the moving standard deviation. In one configuration, the monitoring value corresponds to a 3s-moving standard deviation.

In one embodiment, the monitoring value is a weight value with information about the weight of a food in the food preparation pot. A weight value with information about the weight of a food in the food preparation pot may correlate with the weight of the food in the food preparation pot, particularly in the state of rest of the food preparation appliance. In the state of rest of the food preparation appliance, the tool is stopped and the food preparation appliance is turned off in an intended manner, with no external or internal forces acting on the food preparation appliance that appreciably affect the weight value. An influencing external force may be produced, for example, by the user pressing the food preparation appliance downward or placing an object on the food preparation appliance. An influencing internal force may be produced, for example, by dynamic food conversion processes, such as boiling, bubbling water or popping popcorn.

In one embodiment, the control unit is configured such that the control unit determines, i.e. detects, that the predetermined chopping state of the food has been reached when the monitoring value reaches the monitoring threshold. Thus, monitoring or detection with a particularly low control-related effort can be made possible. At the time of determining that the predetermined chopping state of the food has been reached, it may then be found, as the monitoring result, that the desired chopping state has been reached. Preferably, the control unit is configured such that the reaching is a dropping below, i.e. a reaching of the monitoring threshold by falling monitoring values. The risk of an erroneous detection can thus be reduced, particularly if the monitoring value is a measure of dispersion. In one configuration, it is provided that the control unit generates a monitoring result which, for example, leads to the execution of a process if the control unit determines that the predetermined chopping state of the food has been reached.

In one embodiment, the control unit is configured such that the control unit determines, i.e. detects, that the predetermined chopping state of the food has been reached when the monitoring value drops below the monitoring threshold and subsequently remains below the monitoring threshold for a predetermined period. A particularly reliable detection of having reached the desired chopping state of the food in the food preparation pot can be achieved in this manner. It may happen that individual large pieces of the food are temporarily situated outside the reach of the tool within the food preparation pot, e.g. by multiple impacts on a flat tool face from above. In such a special case, the monitoring value, e.g. a value in the form of a measure of dispersion, could drop below the monitoring threshold for a short period of time, until the tool comminutes said piece, which in turn is reflected by the monitoring quantity, so that the monitoring value again exceeds the monitoring threshold. By providing the predetermined period of the monitoring value below the monitoring threshold, reaching the desired chopping state in a particularly precise manner without larger pieces being present can be made possible particularly reliably, even in the above described special case.

In one configuration, the period is predetermined depending on a selected recipe or on a user setting with respect to the chopping result or confidence level desired by the user.

In one embodiment, the at least one sensor is disposed in, preferably integrated into, a support member for carrying the weight of the food preparation pot and/or the food preparation appliance. A particularly compact construction and, at the same time, a particularly precise measurement both of the weight in the state of rest and of the kinetic energy generated during the chopping of hard food ingredients can thus be achieved. In particular, the support member is a pedestal. Preferably, at least two, preferably exactly three and/or at most five, preferably constructionally identical, sensors are provided, in particular weight sensors.

Another aspect of the present disclosure relates to a method for detecting a predetermined chopping state of a food in a food preparation pot during the chopping of the former by an, in particular rotatable, tool of a food preparation appliance comprising the food preparation pot, wherein a sensor signal is transmitted by a sensor, in particular for the weight determination of the food in the food preparation pot, to a control unit of the food preparation appliance, and the control unit determines, during the chopping of the food by the tool, whether a predetermined chopping state of the food has been reached, based on the sensor signal. The predetermined chopping state is specified, for example, by at least one parameter which preferably can be stored in the control unit and/or may in principle correspond to the desired actual chopping state with a certain confidence level. The features, embodiments and effects of the food preparation appliance described in the introduction for achieving the object may also be transferred and applied to this method.

Another aspect of the present disclosure relates to a computer program product which comprises commands which, when the program of the computer program product is executed by a control unit, cause the control unit to execute the steps of the method according to the preceding aspect of the present disclosure. Accordingly, the features, embodiments and effects of the food preparation appliance described in the introduction for achieving the object relate to the computer program product. In particular, the control unit includes a processor and a storage unit. The program, i.e. commands that can be stored in the storage unit or a computer program code, is usually stored in the storage unit. The processor, the storage unit and the computer program code are configured such that a method with several method steps can be executed. A determination or calculation, for example, may be realized by means of method steps.

Exemplary embodiments of the present disclosure will be explained below in more detail, also with reference to Figures. Features of the exemplary embodiments and other alternative or supplementary configurations described hereinafter may be combined individually or in plurality with the claimed subject matters. The claimed scopes of protections are not limited to the exemplary embodiments.

BRIEF DESCRIPTIONS OF THE DRAWINGS

Figure 2:
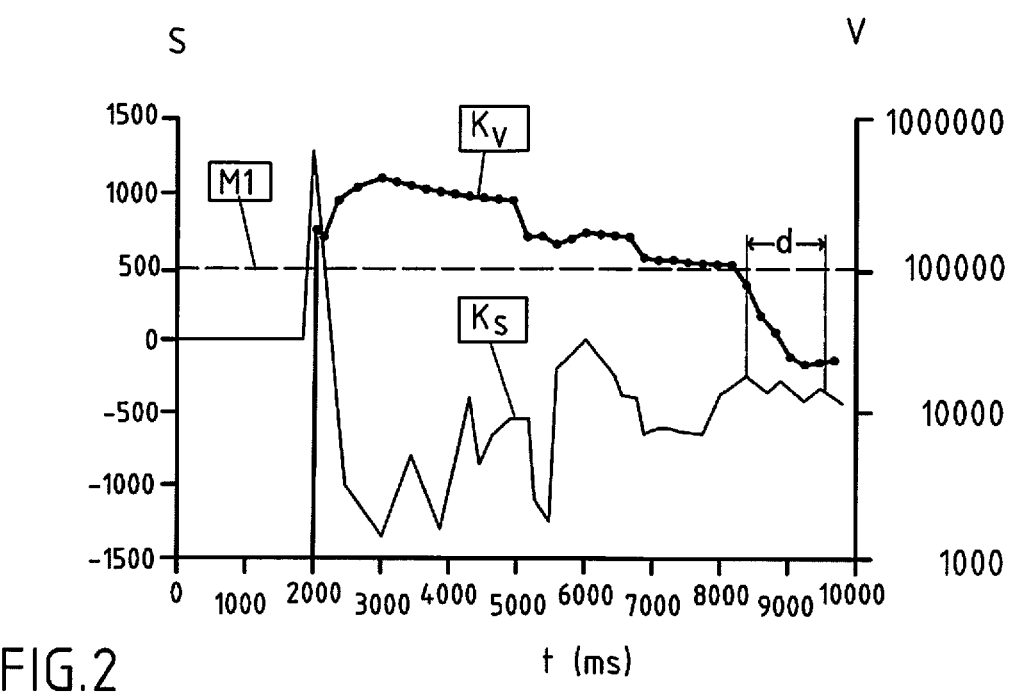
Figure 3A:
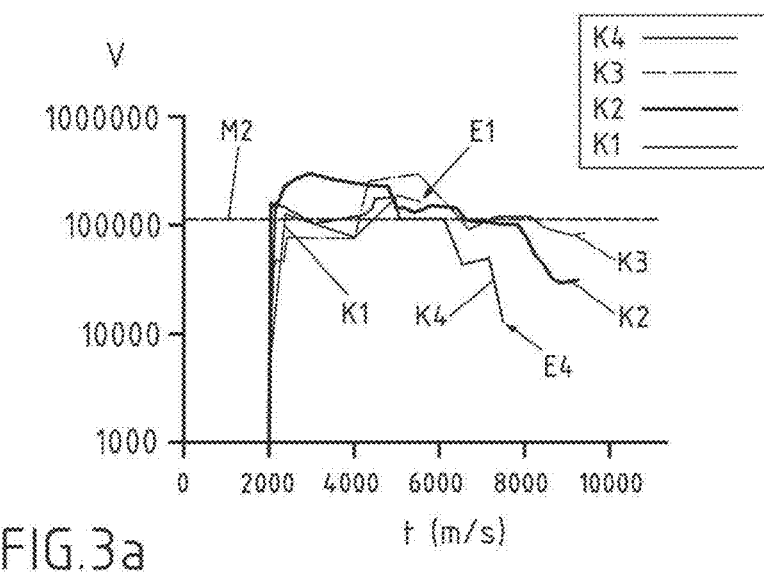
Figure 3B:
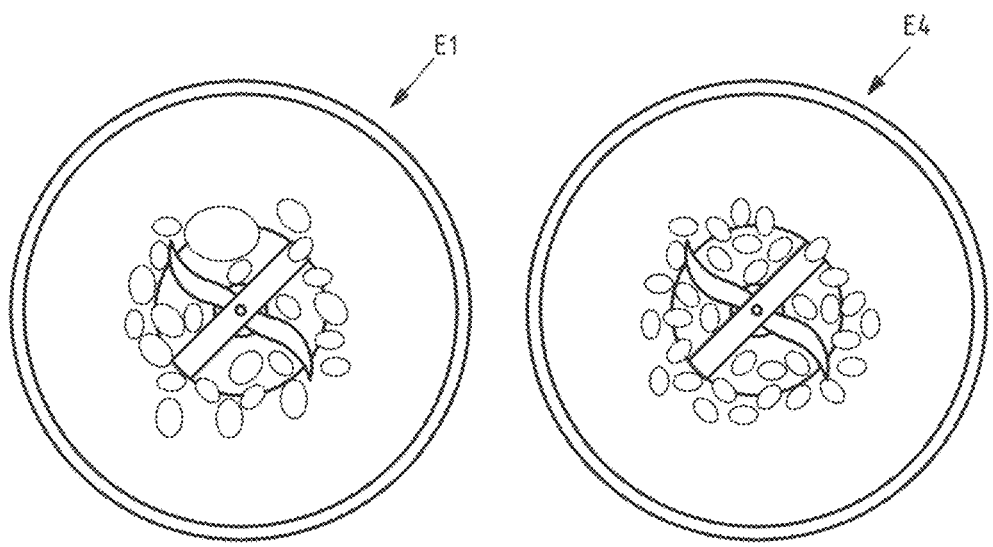
Figure 3B:
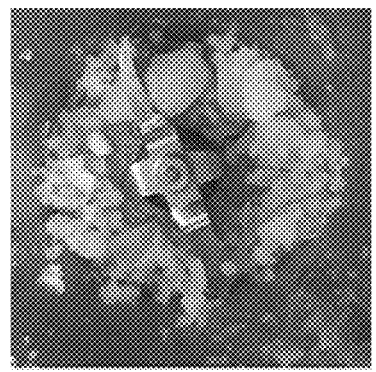
Figure 3C:
Figure 4:
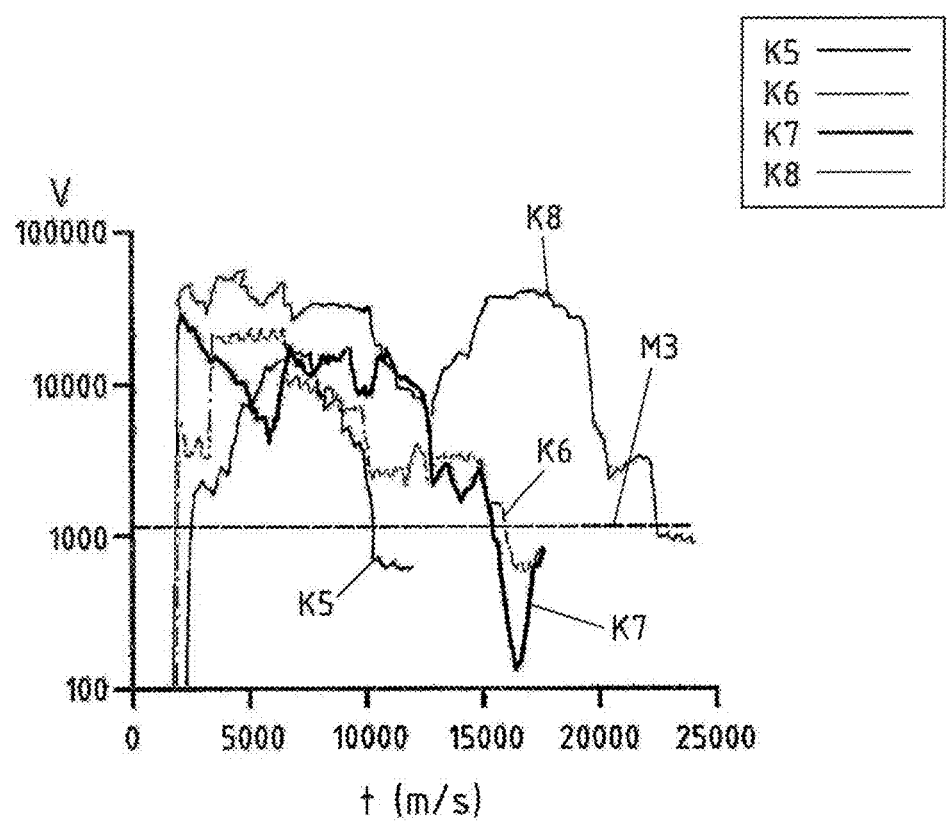

In the Figures:

FIG. 1: shows a schematic representation of a food preparation appliance while chopping food with a tool, the food preparation pot being depicted in a longitudinal section;

FIG. 2: shows an illustration of a measurement diagram with a monitoring threshold and a measured curve of the sensor signal and a measured curve of the monitoring value calculated from the sensor signal;

FIG. 3a: shows an illustration of a measurement diagram with a monitoring threshold and several measured curves of monitoring values from various chopping processes of a food;

FIG. 3b: shows a photographic depiction and a schematic illustration, which corresponds thereto, of a top view into the food preparation pot at the end of the chopping process of the food according to the measured curve K1 from FIG. 3a;

FIG. 3c: shows a photographic depiction and a schematic illustration, which corresponds thereto, of a top view into the food preparation pot at the end of the chopping process of the food according to the measured curve K4 from FIG. 3a;

FIG. 4: shows an illustration of a measurement diagram with a monitoring threshold and several measured curves of monitoring values from various chopping processes for preparing slushed ice from ice cubes.

DETAILED DESCRIPTION

FIG. 1 shows a food preparation appliance 1 while chopping a food 4 with chunky food ingredients in a food preparation pot 2 comprising a tool 5. An electric motor, which is not shown, may drive the tool 5 via a drive shaft 16 for rotation about the rotary axis 8. In particular, the drive shaft 16 is passed from outside into the interior via a pot through-hole 17 in the pot bottom 14 of the food preparation pot 2 in order to rotate the tool 5 in the interior of the food preparation pot 2. In this manner, the tool 5 can be operated with low vibration at high rotary speeds of, for example, 5,000 rpm or 10,000 rpm. Using a sealing means which is not shown in more detail, the pot bottom 14 with the passed-though drive shaft 16 is sealed in a liquid-tight manner. Preferably, the tool 5 has one or more radial tool arms, in particular comprising a blade. Preferably, the tool 5 is a mixing knife. In particular, the food preparation appliance 1 is an electric food processor, preferably with a heating member 9 for heating the food 5 in the food preparation pot 2. In principle, the food preparation device may also be a mixer or cooking machine. In order to prepare food, a food 4 or an ingredient is inserted from above into the food preparation pot 2, and the food preparation pot 2 is covered with a lid 20 which can be locked by means of a locking device 21. For chopping, the user may set by means of the rotary knob 19 a rotary setting for the tool 5, which may be prescribed or recommended by a recipe, for example.

During the chopping of the hard food ingredients, tool collisions occur, as indicated in FIG. 1, which result in cracking acoustic sounds and noise emissions and by which the entire food preparation appliance 1 may be set in abrupt jumping movements and/or vibrational movements. When a balance of the size of the hard food ingredients and the rotary speed of the tool 5 has been reached, such abrupt motion impulses no longer occur in principle, or the intensity of such motion impulses is reduced to a hardly noticeable extent. The rotary speed of the tool 5 is then no longer sufficiently high for splitting up a hard food ingredient which is at rest due to inertia, but rather may generally displace and mix the hard food ingredients. For this particular reason, the degree of chopping or grinding is normally dependent on the rotary speed of the tool, which in turn may be adjusted by the user via the above-mentioned rotary setting. Thus, the desired chopping state may correspond to the chopping state typical for a certain rotary setting. During the chopping or mixing of soft food ingredients, such as mashing boiled potatoes or fruit, movements of the food preparation appliance 1 may also arise if soft food ingredients that have only been comminuted to a small extent are set in rotation by the rotating tool in an unevenly distributed state. However, these movements are not abrupt, in principle, and normally also do not result in cracking sounds.

The weight of the food preparation appliance 1 with a housing 15, the food preparation pot 1 insertable into the housing 15 and food 4 possibly contained therein is received by at least one support member 6a, 6b, 6c, preferably in the form of a pedestal. In particular, the entire food preparation appliance 1, as shown in FIG. 1, is mounted on an underground 10 on exactly three support members 6. In one configuration, as shown in FIG. 1, one sensor 3a, 3b, 3c for weight determination is integrated into each of the support members 6a, 6b, 6c, by means of which, consequently, the total weight of the food preparation appliance 1, the food preparation pot 1 and/or the food 4 can be measured or determined. Since an above-described abrupt movement impulse, particularly the component thereof in the direction of gravity, also acts on the at least one sensor 3a, 3b, 3c for weight determination, the abrupt movement impulse can also be acquired by the sensor 3a, 3b, 3c for weight determination. Thus, an existing and, in particular, already integrated sensor 3a, 3b, 3c for weight determination can be provided in this manner with a dual function. Additional sensors may be saved. As it were, existing devices may also be equipped with the function of determining the end point of a chopping process by means of a mere software update.

By way of example, another sensor 13 for acquiring acoustic emissions and sound, in particular in the form of a microphone, which is attached to the housing 15, is shown in FIG. 1. For controlling the food preparation appliance 1 and processing the sensor data, the food preparation appliance 1 comprises the control unit 7, which includes a processor 11 and a storage unit 12. If it was detected that a predetermined chopping state of the food 4 was reached during a chopping process by means of the tool 5, the control unit 7 can output a corresponding indication to the user via a display 18 and optionally control the drive unit for stopping the tool 5.

FIG. 2 shows a measurement diagram of a chopping process for crushing nine ice cubes for obtaining crushed ice about the size of hailstones, which is also referred as crushed ice. The monitoring threshold M1, a measured curve $K_S$ of the sensor signal S and a measured curve $K_V$ of the monitoring value V calculated from the sensor signal S are shown. The monitoring threshold M1 and the monitoring value V are plotted with the same unit of signal strength (right-hand scale). Due to being converted into the monitoring value, the signal value has a different unit of signal strength (left-hand scale). The calculation or conversion is preferably carried out digitally, but may in principle also be carried out in an analog manner by means of an analog circuit. The time t is plotted on the horizontal axis in ms. Between 0 ms and 1800 ms, the tool is stopped and the food preparation appliance 1 is in the state of rest. The sensor signal S, which may correspond to a sum of the individual sensor signals from the sensors 3a, 3b, 3c for weight determination, was set to zero, subtracting the initially measured total weight of the food preparation appliance 1 including the food 4. At 1800 ms, the tool 5 was set in rotation with a speed between 1500 rpm. and 5000 rpm. Due to the tool collision with the ice cubes, the food preparation appliance 1 starts to jump and vibrate, so that the sensors 3a, 3b, 3c for weight determination respond.

The sensor signal S has a correspondingly large fluctuation. At 8300 ms, all ice cubes have been comminuted, and the system is in a balanced state. The sensor signal S now fluctuates visibly less than in the period between 1800 ms and 8300 ms. Thus, the fluctuations of the sensor signal S return to a normal level and maintain this intensity of fluctuation. In order to render the above-described transition at 8300 ms capable of being automatically evaluated or monitored, the monitoring value V was calculated from the sensor signal S. In FIG. 2, the monitoring value V corresponds to the running variance or moving variance of the sensor signal S, which is calculated as follows. First, the mean $\mu$ of the previously acquired sensor signals S is subtracted. In particular, the equation $$\mu = \frac{\sum S_i}{k}$$

serves for determining the mean, with k being the number of the measured values so far. In an alternative configuration, the mean is a moving mean. By taking the mean, a signal drift can be counteracted. In order to smooth the monitoring value V, a window with a predetermined number F of values, preferably 15 values, is considered. The last F difference values $\delta_i$ with the measured value index i that correspond to the difference of the sensor signal S and the mean i.e. $\delta_i = \mu - S_i$, are squared and added up to form the variance $\sigma^2$. In particular, the following equation is used for determining the variance $\sigma_k^2$:

$$\sigma_k^2 = \sum_{i=k-F}^{k} \delta_i^2 / (F-1)$$

The predetermined chopping state has been reached if this variance $\sigma^2$ drops below the monitoring threshold M1 and remains below the monitoring threshold M1 for a period d. In particular, the period d is permanently stored in the control unit 7 and in this example, and in particular also in the following examples, is 1500 ms. Since the monitoring value V has not exceeded the monitoring threshold M1 between 8300 ms and 9800 ms, the control unit 7 determines at 9800 ms that the predetermined chopping state of the food 4 has been reached, and automatically stops the tool 5.

For this monitoring process, the observation of a force in the direction of gravity on only a single support member 6a, 6b, 6c with its integrated sensor 3a, 3b, 3c, or of the total system weight or the total system weight force in the direction of gravity on all support members 6a, 6b, 6c with the respectively integrated sensors 3a, 3b, 3c, is sufficient, wherein in the latter configuration, an individual evaluation for the individual sensors 3a, 3b, 3c, for example in existing individual pedestals, is not necessary.

Depending on the recipe, the monitoring threshold, i.e. the threshold value, may be set differently, taking into account the food ingredients (e.g. Parmesan cheese or ice) or the goal of the recipe (e.g. desired degree of chopping, e.g. adjustable via the rotary setting). Preferably, the control unit 7 can access the monitoring threshold, which was set by the user or prescribed by a digital recipe. Thus, the control unit 7 can employ different monitoring thresholds M1, M2, M3 for different recipes. For grinding, i.e. crushing, ice, the monitoring thresholds M1 and M2 of the FIGS. 2 and 3a of 110,000 units may be used, and for preparing slushed ice from ice cubes, as in FIG. 4, the monitoring threshold M3 of 1,400 units may be used. A monitoring threshold of 1,900 units has proved suitable for preparing finely ground almonds, and/or a monitoring threshold of 330 units for obtaining finely ground dried peas. Every monitoring threshold M1, M2, M3 can be used independently of the quantity and state of the food constituents or ingredients, as the FIGS. 3a, 3b, 3c and FIG. 4 show, for example.

FIG. 3a shows a measurement diagram with a monitoring threshold M2 and several measured curves K1, K2, K3, K4 of monitoring values V in the form of a 3s moving standard deviation from different chopping processes for preparing crushed ice from ice cubes. In the case of the measured curves K2 and K3, nine ice cubes were crushed, respectively, and in the case of the measured curves K1 and K4, six ice cubes were respectively crushed at the same rotary setting. In the case of the measured curves K2, K3 and K4, when the control unit 7 determined that the predetermined chopping state had been reached after they had dropped below the threshold value M2, i.e. after the first measured point smaller than M2, the tool 5 was stopped for the period d. According to the visual inspection, the samples of the measured curves K2, K3 and K4 had substantially the same degree of chopping and all matched the desired degree of chopping. FIG. 3c shows a photograph of the sample of the measured curve K4 after stopping the tool at the end E4 of the measured curve K4. The samples of the measured curves K2 K3 appeared to be comparable with the preparation result of FIG. 3c. In the case of measured curve K1, the chopping process was stopped early for testing purposes, before the control unit 7 was able to determine whether the predetermined chopping state had been reached. The photograph of the sample upon stopping the tool at point $\mu$l is shown in FIG. 3b. At least one ice cube was found to be oversized, which was not crushed as desired. The curve pattern of measured curve K1 shows that the measured curve K1 had dropped below the monitoring threshold M2 for a short period of time, but for a shorter time than the predetermined period d, so that the control unit 7 did not stop the tool 5. Within this short period, the oversized piece of ice was temporarily outside the reach of the blade of the tool 5. In case of the measured curves K1, K2, K3 and K4, the tool 5 was driven at a constant set rotary speed of at least 1500 rpm and/or at most 5000 rpm.

FIG. 4 shows a measurement diagram with a monitoring threshold M3 and several measured curves K5, K6, K7, K8 of monitoring values V from different chopping processes for preparing slushed ice from ice cubes. In the case of the measured curves K5 and K6, six ice cubes were crushed in each case, in the case measured curve K7, nine ice cubes, and in the case of the measured curve K8, fifteen ice cubes, always at the same rotary setting. In the case of all measured curves K5, K6, K7, K8, when the control unit 7 determined that the predetermined chopping state had been reached after they had dropped below the threshold value M3, the tool 5 was stopped for the period d. According to the visual inspection, the samples of these measured curves K5, K6, K7, K8 had substantially the same degree of chopping and all matched the desired degree of chopping. In the case of the measured curves K5, K6, K7 and K8, the tool 5 was driven at a constant set rotary speed of about 10,000 rpm. As in FIG. 3a, the monitoring value V is a 3s moving standard deviation of the sensor signal from the sum of the sensors 3a, 3b, 3c. In this case, the ice cubes had a weight of approx. 30 g.

As the FIGS. 3a, 3b, 3c and 4 show, the end point in time of a chopping process with the respectively desired chopping state could be reliably and precisely determined by the control unit 7, in spite of different initial qualities or process parameters. The end point of chopping or the time of the food reaching the desired chopping state can take place independently of the quantity and state of the food ingredients, that is, in the case of ice cubes or deep-frozen fruit for preparing ice cream, for example, for different sizes, freezing levels and number. In this case, the degree of chopping or grinding may still be largely determined via the rotary setting and adjusted by the user, as usual. The chopping time may be adapted to the actual conditions during the chopping process. The jumping and vibrational movement due to the abrupt impulses continues to take place as long as there are still larger pieces located in the food preparation pot during the chopping process. The chopping process may be interrupted precisely at the time at which all large pieces are broken up.

The invention claimed is:

1. A food preparation appliance comprising:
a food preparation pot;
a rotatable tool including a mixing knife;
a weight-carrying supporting member for carrying a weight of the food preparation pot;
a sensor disposed in the weight-carrying supporting member and configured to generate a sensor signal during chopping of the food by the mixing knife, wherein the sensor signal corresponds to a plurality of abrupt jumping movements stemming from motion impulses caused by collisions of the mixing knife with hard food ingredients, wherein the collisions result in abrupt acoustic sounds and noise emissions, and wherein the plurality of abrupt jumping movements are not resulting from chopping of a soft food or already sufficiently comminuted food; and
a control unit communicatively coupled to the sensor and configured to determine, based on the sensor signal received from the sensor that a predetermined chopping state of the food has been reached,
wherein the control unit determines that the predetermined chopping state of the food has been reached based on a monitoring value derived from the sensor signal that corresponds to the plurality of abrupt jumping movements stemming from motion impulses caused by collisions of the mixing knife with hard food ingredients, and wherein the monitoring value is a measure of dispersion of a weight value indicative of a weight of the food in the food preparation pot.

2. The food preparation appliance of claim 1, wherein the control unit is configured such that an indication is outputted to the user.

3. The food preparation appliance of claim 2, wherein the control unit is configured such that the mixing knife is automatically stopped when the control unit has determined, based on the sensor signal, that a predetermined chopped state of the food has been reached.

4. The food preparation appliance of claim 3, wherein the predetermined chopped state is defined by a monitoring threshold.

5. The food preparation appliance of claim 4, wherein the control unit is configured such that the monitoring threshold is predetermined depending on a selected recipe.

6. The food preparation appliance of claim 1, wherein the control unit is configured to calculate the monitoring value based on the sensor signal of several sensors.

7. The food preparation appliance of claim 1, wherein the monitoring value is a measure of dispersion.

8. The food preparation appliance of claim 7, wherein the control unit is configured to determine that the predetermined chopping state of the food has been reached in response to the monitoring value reaching the monitoring threshold.

9. The food preparation appliance of claim 1, wherein the control unit is configured to determine that the predetermined chopping state of the food has been reached in response to the monitoring value reaching the monitoring threshold.

10. The food preparation appliance of claim 1, wherein the control unit is configured to determine that the predetermined chopping state of the food has been reached in response to the monitoring value being less than the monitoring threshold for a predetermined period.

11. The food preparation appliance of claim 1, wherein the control unit is configured such that a process parameter for food preparation is automatically adjusted when the control unit has determined, based on the sensor signal, that a predetermined chopped state of the food has been reached.

12. The food preparation appliance of claim 1, wherein the control unit is configured to determine that the predetermined chopping state of the food has been reached in response to the monitoring value dropping below the monitoring threshold and subsequently remaining below the monitoring threshold for a predetermined period.

* * * * *